United States Patent [19]

Porter

[11] 4,425,987

[45] Jan. 17, 1984

[54] DUAL ROTATING MECHANICAL LOCK

[75] Inventor: Clyde R. Porter, Los Angeles, Calif.

[73] Assignee: P. L. Porter Company, Woodland Hills, Calif.

[21] Appl. No.: 160,133

[22] Filed: Jun. 16, 1980

[51] Int. Cl.³ .............................................. B65H 59/10
[52] U.S. Cl. ................................. 188/67; 188/77 W; 192/81 R
[58] Field of Search ................... 188/67, 77 W, 24.16, 188/265; 92/15, 16, 20; 192/81 R

[56] References Cited

U.S. PATENT DOCUMENTS

| | | | |
|---|---|---|---|
| 2,750,994 | 6/1956 | Howell, Jr. | 188/67 |
| 3,064,766 | 11/1962 | Hanizeski | 188/77 W |
| 3,230,595 | 1/1966 | Kedem | 188/67 |
| 3,249,180 | 5/1966 | Torossian | 188/67 |
| 3,874,480 | 4/1975 | Porter et al. | 188/77 W |
| 3,929,209 | 12/1975 | Peckham, Jr. | 188/24.16 |

Primary Examiner—Douglas C. Butler
Assistant Examiner—R. R. Diefendorf
Attorney, Agent, or Firm—Beehler, Pavitt, Siegemund, Jagger & Martella

[57] ABSTRACT

A mechanical lock of the type in which axial transla- tional movement of a rod is prevented by a coil spring which encircles the rod and grips it and being readily released by application of a relatively small force through a relatively short stroke, thereby permitting the mechanical lock to be controlled by a pushbutton con- trol. Rotating bushings adjacent the ends of the springs have beveled faces which cause the locking turns at the ends of the spring to become cocked on the rod to provide a true locking action. The device is unlocked by rotation of the rotating bushings, which unwind the locking turns of the spring, thereby releasing the grip of the spring on the rod. The rotating bushings are rotated in opposite directions by actuating levers which extend outside of the housing of the device. The actuating levers are provided with rollers and are located at the same station along the axis of the rod. A symmetrical wedge-shaped cam is mounted so that it can be drawn axially between the rollers, forcing them apart circum- ferentially and thereby rotating the actuating lever about the axis of the rod. The wedge-shaped cam is drawn in an axial direction by a cable which is con- nected to the pushbutton control. The structure of the device simplifies its assembly, thereby reducing the production cost.

1 Claim, 4 Drawing Figures

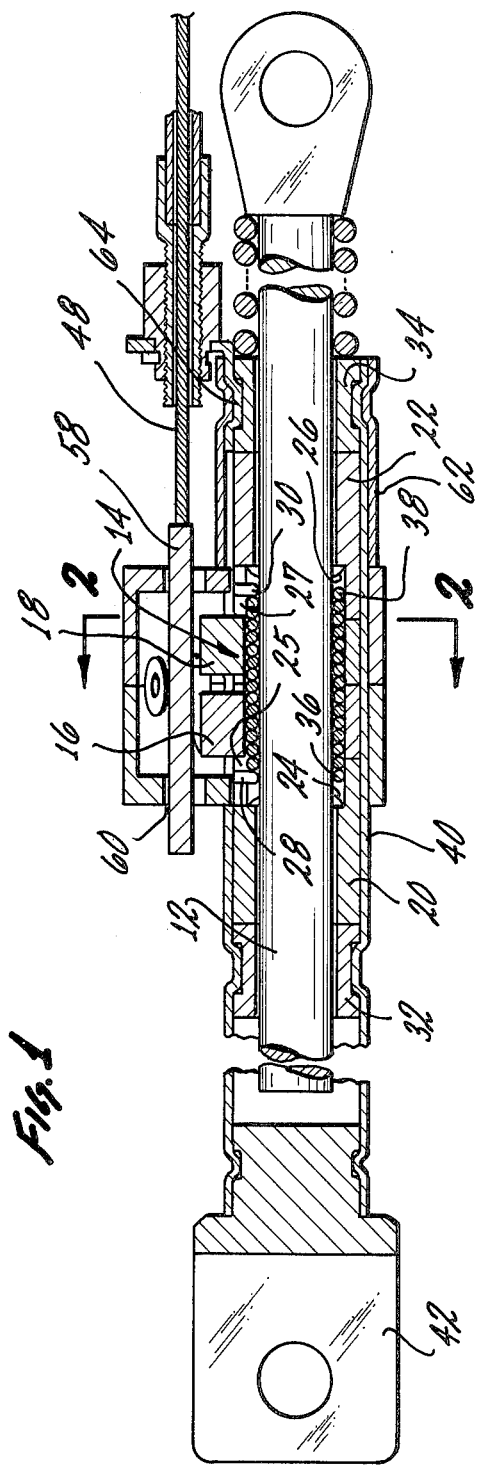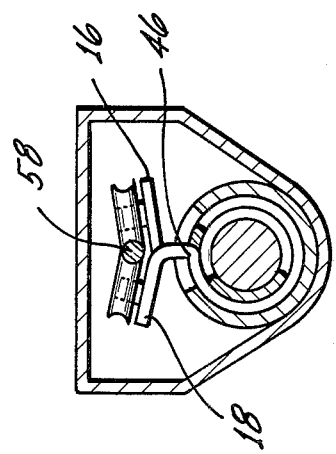

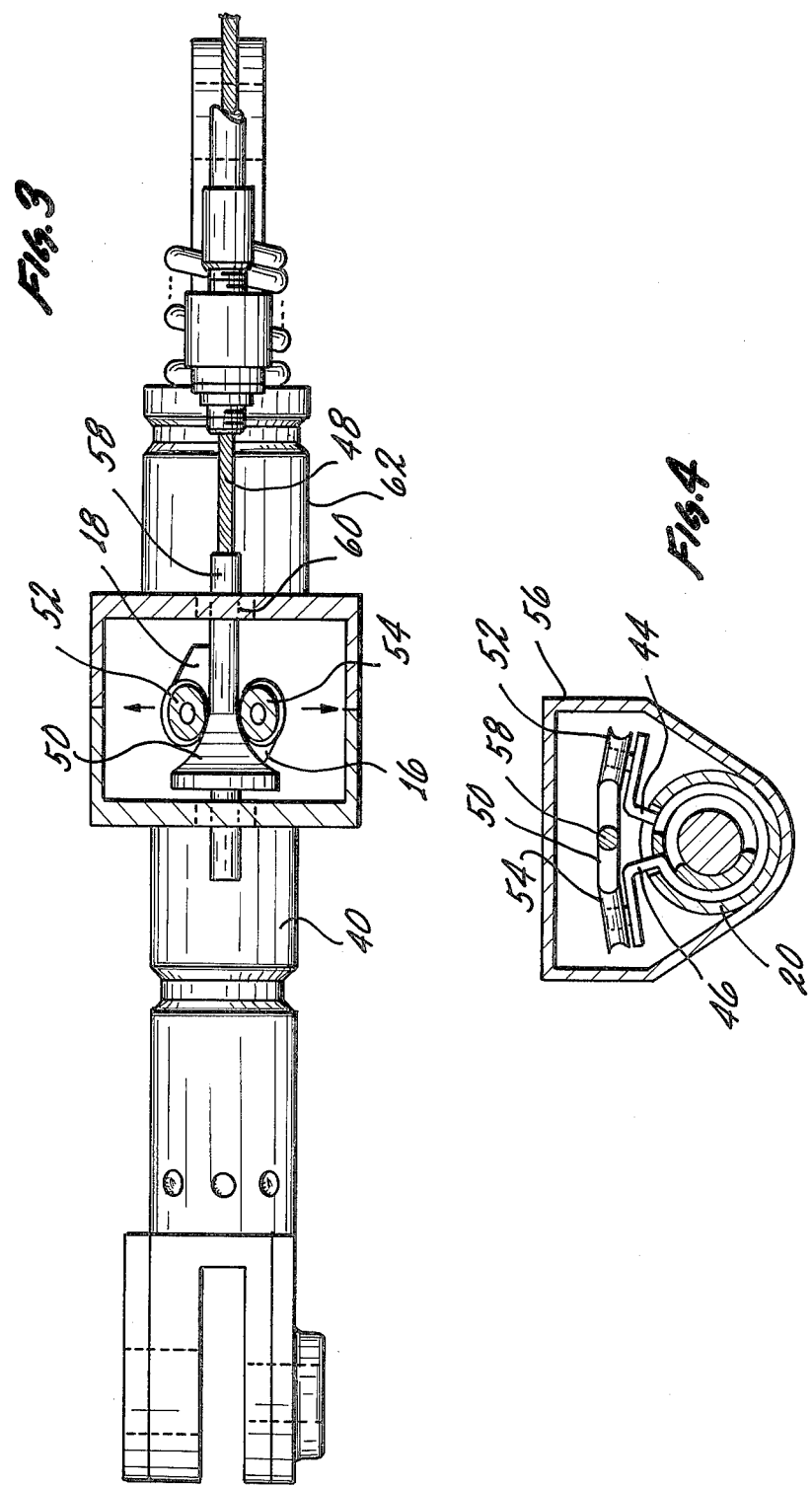

DUAL ROTATING MECHANICAL LOCK

BACKGROUND OF THE INVENTION

1. Field of the Invention

The present invention is in the field of mechanical locking devices and specifically relates to a device of the type in which the locking is effected by a coiled spring which grips a rod, for clamping two members against translational motion and for selectively enabling such motion when the ends of the springs are twisted in opposite directions simultaneously to unwind the coiled springs, thereby relaxing its grip on the rod.

2. The Prior Art

The present invention includes a rod which extends into a cylindrical housing. Normally, the present invention locks the rod with respect to the housing so that axial translational motion of the rod relative to the housing is prevented. The mechanical lock can be selectively actuated to an unlocked state in which motion of the rod is enabled. In the present invention, the opposite ends of the spring are each connected to actuator levers which are used to rotate the opposite ends of the spring in opposite directions to unwind the spring, so that its diameter increases slightly, thereby causing the spring to relax its grip on the rod, which may then be moved freely axially relative to the housing.

The use of a coiled spring to grip a rod extending coaxially through the spring is well known. A number of locking devices making use of this basic principle have been patented. While all of the patented devices use this same fundamental principle, the implementations employed are patentably distinct. The present invention is believed to provide still another new and useful implementation.

In U.S. Pat. No. 3,230,595 issued Jan. 25, 1966 to Kedam, there is shown a rod-clamping device in which both ends of the spring are rotated simultaneously to lock and unlock the device. However, rotation of the ends of the spring is not produced by an actuator lever, but instead by grooves which exert a camming action on the ends of the spring. The device described in Kedam's patent includes no provision for causing the last few turns at each end of the spring to become cocked on the rod to produce a more positive locking engagement.

This latter feature is shown clearly in U.S. Pat. No. 3,249,180 issued May 3, 1966 to Torossian and in U.S. Pat. No. 2,750,994 issued June 19, 1956 to Howell. However, in these patents, only one end of the spring is rotated to lock and unlock the device and therefore the stroke required is longer than in the present invention.

In U.S. Pat. No. 3,874,480 issued Apr. 1, 1975 to Porter et al., there is described a friction brake mechanism in which two springs are unwound simultaneously to unlock the grip of the springs on a rod. Also, in U.S. Pat. No. 3,064,766 issued Nov. 20, 1962, Hanizeski shows a spring lock in which two separate springs are simultaneously unwound by an electromagnetic device to produce the desired unlocking.

All of the above-mentioned inventions can be distinguished on the basis of their structures from the device of the present invention. The present invention arose from the desirability of having a true locking action of the type wherein the last few turns at the ends of the spring become cocked on the rod, but at the same time being releasable by actuation through a relatively short stroke and by means of a cable which extends in the axial direction. This particular combination of features was unavailable in the known prior art and necessitated the present invention.

SUMMARY OF THE INVENTION

In the present invention, both ends of the spring are rotated simultaneously to unlock the device. This is done in a balanced manner by means of a novel actuator in which the motion of a cable in a direction parallel to the axis of the rod pulls a wedge-shaped cam between two actuating levers to rotate them equally, but in opposite directions in a balanced manner.

The actuating motion is transmitted from the actuating levers to rotating bushings which in turn engage the ends of the spring. The faces of these rotating bushings adjacent the spring are bevelled so that any force applied to the rod will tend to cause the last few turns on the spring to become cocked on the rod to provide a true locking engagement in which the locking force increases as the disturbing force applied to the rod increases.

Because the spring is unwound from its ends which lockingly engage the rod, a very short stroke of the actuator is possible, because it is not necessary for the entire spring to be unwound, but only the first few turns at each end.

The short stroke achieved with the actuator used in the present invention permits pushbutton control of the device, which is desirable from a styling and convenience standpoint.

The novel features which are believed to be characteristic of the invention, both as to organization and method of operation, together with other objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is a cross-sectional elevation view of the dual rotating mechanical lock of the present invention in a preferred embodiment;

FIG. 2 is a cross-sectional view taken in the direction 2—2 indicated in FIG. 1 and showing the positions of the actuating levers when the device is in in its normal locked state;

FIG. 3 is a top view partially in section of the device of FIG. 1; and,

FIG. 4 is a cross-sectional view comparable to FIG. 2 and showing the relative position of the actuating levers when the device has been actuated to its unlocked state.

DETAILED DESCRIPTION OF THE PREFERRED EMBODIMENT

Turning now to the drawings, in which like parts are denoted by the same reference numeral throughout, it is seen that the preferred embodiment of the invention includes a rod 12 having a mounting 13 at its free end, and selectively slideable axially within a housing 40 having a mounting attachment 42 at one end. Normally, motion of the rod 12 with respect to the housing 40 is prevented by the spring 14 which normally grips the rod 12 tightly.

Rotating bushings 20, 22 are located at opposite ends of the spring 14, and axial motion of the rotating bushings 20, 22 is prevented by the fixed bushing 32, 34, which are swaged to the housing 40.

The spring 14 includes radially-extending tangs 28, 30, which fit into axially extending slots 25, 27 in the rotating bushings 20, 22. The rotating bushings 20, 22 include bevelled faces 24, 26 against which the locking coils 36, 38 of the spring 14 bear, thereby becoming cocked with respect to the rod 12 to lock the rod against axial translational motion with respect to the housing 40.

Actuating levers 16, 18, best seen in FIGS. 2 and 4, are shaped to encircle the spring 14, and portions 44, 46 of actuating levers extend into the same axially-extending slots 25, 27 in the rotating bushings 20, 22 as the tangs 28, 30 of the spring 14, so that as the actuating levers are rotated about the axis of the rod, that motion is coupled by the portions 44, 46 to the rotating bushings 20, 22 and thence to the tangs 28, 30 of the spring 14 causing the spring to unwind slightly, thereby releasing its grip on the rod 12. Because the locking coils 36,38 of the spring 14 are the coils nearest the end of the springs, and because it is those ends of the spring that are rotated by the rotating bushings 20, 22, the amount of stroke of the actuating levers 16, 18 is minimized. In some locking devices known in the prior art, it is necessary to unwind the entire length of the spring to release the rod, and this requires a much longer stroke than is required in the present invention.

Also, in some mechanical locks known in the prior art, two springs are employed, and to unwind both of those springs requires a greater actuating force than is required in the present invention which employs only a single spring.

Because of the reduced stroke and reduced actuating force in the present invention, it is practical to use a push-button for unlocking the mechanical lock of the present invention. The use of a pushbutton for actuation is very desirable from the standpoint of styling and convenience.

When an operator presses on the control button to release the lock, the cable 48 is drawn to the right as viewed in FIG. 1. One of the novel features of the present invention is the manner in which this motion of the cable is used to operate the actuating levers 16, 18.

As best seen in FIGS. 3 and 4, each of the actuating levers 16, 18 includes a roller mounted on it, and in accordance with a preferred embodiment of the invention, rollers 52, 54 are forced apart as indicated by the arrows in FIG. 3, when the wedge-shaped cam 50 is drawn in the direction shown. This separating movement of the rollers 52, 54 is opposed by the spring 14 which is being unwound as the wedge-shaped cam 50 is drawn between the rollers 52, 54. This unwinding of the spring 14 releases the grip of the spring on the rod 12. A plastic housing 56 encloses the roller mechanism and serves to keep foreign matter from contaminating it. In the preferred embodiment, the wedge-shaped cam 50 includes a guide bar 58, which is rigid, as opposed to the flexible cable 48, and grooves 60 in the walls of the plastic housing 56 cooperate with the guide bar 58 to maintain proper alignment of the wedge-shaped cam 50. In an alternative embodiment, a return spring may be included within the plastic housing 56 to urge the wedge-shaped cam 50 leftward as viewed in FIG. 3, to its normal locked position.

The advantages of using the wedge-shaped cam 50 and the rollers 52, 54 to operate the actuating levers 16, 18 can readily be seen. From FIG. 3 it is clear that the actuating levers 16, 18 will be rotated simultaneously in opposite directions about the axis of the rod by equal amounts, thereby insuring that both ends of the spring 14 are unlocked at the same instant. Further, the rollers 52, 54 are centered along a line perpendicular to the axis of the rod 12, and therefore the forces between the wedge-shaped cam and the rollers 52, 54 are balanced and there is no tendency to produce a torque on the device; the mechanical lock is subjected to an axial force only. Finally, the mechanism employed in the present invention is a compact and convenient way of converting an axial motion of the cable 48 into two balanced opposed rotational motions of the roller.

As best seen in FIG. 1, assembly of the mechanical lock is simplified by its structure. Typically, the fixed bushing 32, the rotating bushing 20, the spring 14, the rotating bushing 22, and the fixed bushing 34 are slid onto the rod 12. A slot 60 extends axially in the housing 40 to permit the actuating levers 16, 18 to be slid into position encircling the spring 14. Because this slot would not permit proper swaging at the right-hand end of the device as shown in FIG. 1, a sleeve 62 is applied over the housing 40 prior to the swaging operation. Also, a control bracket 64 is positioned adjacent the fixed bushing 34 prior to the swaging operation so that the control bracket 64 will be permanently fastened to the lock when the suaging operation has been completed. The plastic housing 56 consists of two halves in a preferred embodiment, and these snap together and are held at a proper position circumferentially by means of a tang in the housing 40.

Thus, there has been described a mechanincal lock which has a structure that permits the lock to be controlled by a pushbutton. This is made possible by the low stroke and actuating force requirements of the device. It is also seen that the structure of the device facilitates assembly of the mechanical lock and this, in turn, helps to reduce the production costs.

The foregoing detailed description is illustrative of a preferred embodiment of the invention, but it will be understood that additional embodiments thereof will be obvious to those skilled in the art. The embodiments described herein, together with those additional embodiments are considered to be within the scope of the invention.

What is claimed is:

1. A mechanical lock for normally peventing axial motion of a rod with respect to a housing and for selectively permitting such motion when unlocked by an operator, said mechanical lock comprising in combination:

a coil spring having a first end and a second end;
a rod extending coaxially through said coil spring, the diameter of said rod being slightly larger than the inside diameter of said coil spring when it is not mounted on said rod, so that said coil spring normally grips said rod tightly when mounted on said rod;
a first rotatable bushing mounted coaxially on said rod adjacent the first end of said coil spring and including a surface inclined at an acute angle with respect to the axis of said coil spring and so located as to contact a portion of the last coil at the first end of said coil spring, whereby an axial load on said rod in a first direction wil cause said last coil to become cocked so as to grip said rod more tightly;

a second rotatable bushing mounted coaxially on said rod adjacent the second end of said coil spring and including a surface inclined at an acute angle with respect to the axis of said coil spring and so located as to contact a portion of the last coil at the second end of said coil spring, whereby an axial load on said rod in a second direction will cause said last coil to become cocked so as to grip said rod more tightly;

said first rotatable bushing and said second rotatable bushing engaging said first end and said second end respectively of said coil spring so that when said first rotatable bushing and said second rotatable bushing are rotated about said rod in opposite directions said coil spring will be slightly unwound at its first end and second end thereby releasing the last coil at the first end of said coil spring and the last coil at the second end of said coil spring from their locking engagement with said rod to permit axial translational motion of said rod with respect to said coil spring;

a first actuating lever connected to said first rotatable bushing and rotatable about the axis of said rod;

a second actuating lever connected to said second rotatable bushing and rotatable about the axis of said rod; said first actuating lever and said second actuating lever positioned at the same location along the axis of said rod and spaced circumferentially from each other;

a wedge-shaped cam mounted for motion in a direction parallel to the axis of said rod and positioned circumferentially between said first actuating lever and said second actuating lever to force said first actuating lever and said second actuating lever apart when said wedge-shaped cam is drawn in the direction parallel to the axis of said rod, whereby said first actuating lever and said second actuating lever are rotated about the axis of the rod simultaneously in opposite senses by equal amounts to unlock the first end and the second end of said coil spring.

* * * * *